US009249776B2

(12) United States Patent
Baehmann et al.

(10) Patent No.: US 9,249,776 B2
(45) Date of Patent: Feb. 2, 2016

(54) WIND TURBINE DOME AND METHOD OF ASSEMBLY

(71) Applicant: GENERAL ELECTRIC COMPANY, Schenectady, NY (US)

(72) Inventors: Peggy Lynn Baehmann, Glenville, NY (US); Fulton Jose Lopez, Clifton Park, NY (US); Ian David Wilson, Simpsonville, SC (US); Robert Michael Zirin, Marblehead, MA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/183,892

(22) Filed: Feb. 19, 2014

(65) Prior Publication Data

US 2015/0233342 A1 Aug. 20, 2015

(51) Int. Cl.
*F03D 1/00* (2006.01)
*F03D 1/04* (2006.01)
*F03D 1/06* (2006.01)

(52) U.S. Cl.
CPC ............... *F03D 1/04* (2013.01); *F03D 1/0691* (2013.01); *F05B 2240/14* (2013.01); *Y10T 29/49316* (2015.01)

(58) Field of Classification Search
CPC ..................... E04B 1/32; F03D 1/04
USPC .......... 52/84, 80.1, 81.1, 81.2, 81.3, 81.5, 63, 52/639, 643, 80.2, 86, 82, 645–646, 648.1, 52/652.1, 655.1, 653.1, 651.11, 3; 416/200 R, 201 R, 201 A, 245 R
See application file for complete search history.

(56) References Cited

U.S. PATENT DOCUMENTS

| 2,753,818 | A | * | 7/1956 | Green ................................ 52/63 |
| 3,763,608 | A | * | 10/1973 | Chamlee ......................... 52/81.4 |
| 4,285,481 | A | | 8/1981 | Biscomb |
| 4,663,898 | A | * | 5/1987 | Yacaboni ........................... 52/82 |
| 4,784,172 | A | * | 11/1988 | Yacaboni ......................... 135/87 |
| 5,020,967 | A | | 6/1991 | Gual et al. |
| 5,724,775 | A | * | 3/1998 | Zobel et al. ........................ 52/82 |
| 6,276,095 | B1 | * | 8/2001 | Tripsianes ...................... 52/81.1 |
| 6,334,456 | B1 | * | 1/2002 | Nevak ............................. 135/135 |
| 6,358,014 | B1 | * | 3/2002 | Chou et al. ................. 416/245 R |
| 6,658,800 | B2 | * | 12/2003 | Monson et al. ................. 52/81.1 |
| 7,075,189 | B2 | | 7/2006 | Heronemus |
| 7,329,099 | B2 | | 2/2008 | Hartman |

(Continued)

FOREIGN PATENT DOCUMENTS

| CN | 1948717 A | 4/2007 |
| CN | 202645844 U | 1/2013 |

(Continued)

OTHER PUBLICATIONS

Hansen, "A New Technology for Super-efficient Structures", Towerdome.

(Continued)

*Primary Examiner* — Beth Stephan
(74) *Attorney, Agent, or Firm* — Francis T. Coppa

(57) ABSTRACT

An aerodynamic dome structure that is placed in front of a wind turbine hub includes a plurality of arcuate panels. The arcuate panels are interconnected to form a dome-shaped structure. A plurality of arcuate radial spar supports may be employed to support the arcuate panels.

20 Claims, 4 Drawing Sheets

(56) References Cited

U.S. PATENT DOCUMENTS

| | | |
|---|---|---|
| 7,728,455 B2 | 6/2010 | Branco |
| 7,859,126 B2 | 12/2010 | Ferguson |
| 7,900,405 B1 * | 3/2011 | Jacoby ............................ 52/81.3 |
| 8,182,234 B2 | 5/2012 | Willey |
| 8,251,670 B2 * | 8/2012 | Anghileri .................. 416/245 R |
| 8,287,243 B2 * | 10/2012 | Herr et al. ................. 416/245 R |
| 8,307,605 B2 * | 11/2012 | McCarty .................... 52/745.07 |
| 8,317,469 B2 * | 11/2012 | Kinzie et al. ............... 415/211.2 |
| 8,348,618 B2 | 1/2013 | Hartman |
| 8,354,759 B2 * | 1/2013 | Marchand ....................... 290/55 |
| 8,382,440 B2 | 2/2013 | Baker et al. |
| 8,393,865 B2 | 3/2013 | Vronsky et al. |
| 8,985,947 B2 * | 3/2015 | Obrecht et al. ................. 416/62 |
| 2003/0226319 A1 * | 12/2003 | Richards ........................ 52/80.1 |
| 2012/0141250 A1 * | 6/2012 | Kinzie et al. ...................... 415/1 |
| 2012/0301297 A1 | 11/2012 | Ludwick |
| 2013/0052014 A1 | 2/2013 | Kelly |
| 2013/0121841 A1 * | 5/2013 | Obrecht et al. ........... 416/245 R |
| 2014/0003940 A1 * | 1/2014 | Opaits et al. .................... 416/23 |
| 2014/0140851 A1 * | 5/2014 | Khan ....................... 416/204 R |

FOREIGN PATENT DOCUMENTS

| | | |
|---|---|---|
| DE | 10247072 A1 | 4/2004 |
| FR | 2546239 B1 | 11/1984 |
| GB | 2466477 B | 1/2013 |

OTHER PUBLICATIONS

Gil, FR2546239 French Patent Bibliographic Data, English Translation.

Xu, CN1948717 Chinese Patent Bibliographic Data, English Translation.

Buch et al., DE10247072 German Patent Bibliographic Data, English Translation.

Deng, CN202645844 Chinese Patent Bibliographic Data, English Translation.

* cited by examiner

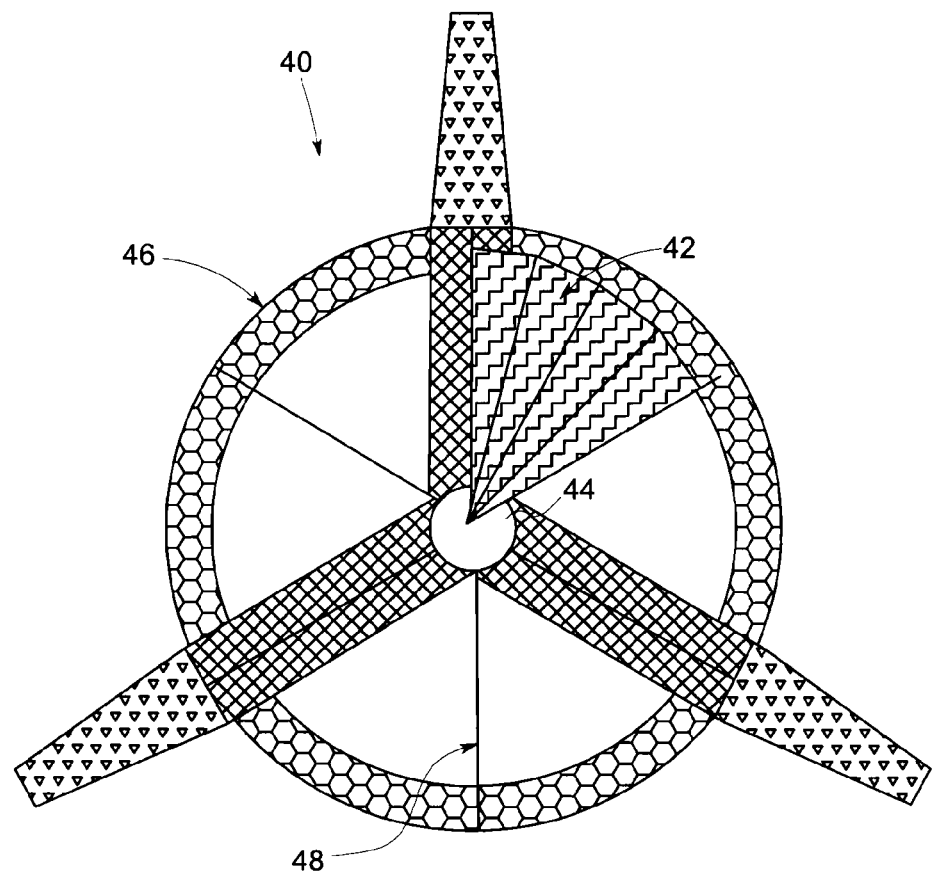
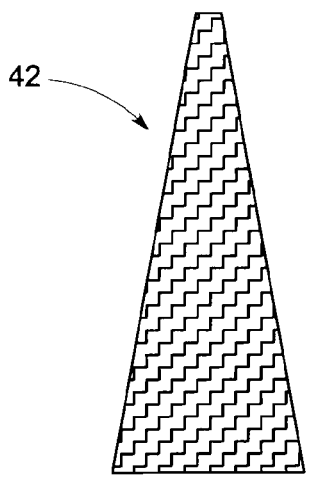
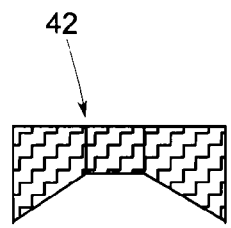
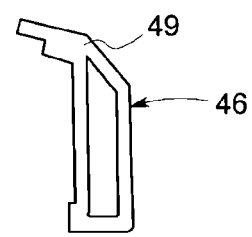
FIG. 4
FIG. 5
FIG. 6
FIG. 7

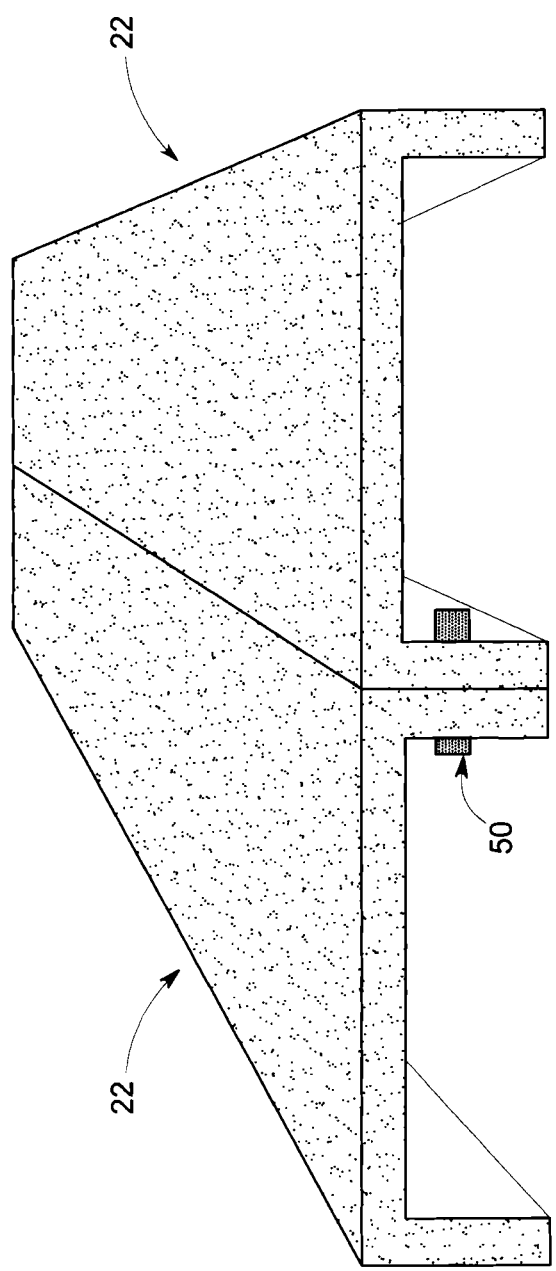

WIND TURBINE DOME AND METHOD OF ASSEMBLY

BACKGROUND

The subject matter of this disclosure relates generally to wind turbines, and more particularly, to an aerodynamic dome structure that is placed in front of a wind turbine hub for increasing the aerodynamic efficiency of an existing wind turbine. In particular, embodiments disclosed herein relate to methods of manufacturing and assembling dome structures that enable an acceleration of an airflow into more aerodynamically efficient region of a wind turbine rotor blade providing an increase in efficiency of an existing wind turbine.

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. However, as the size of wind turbines increases, so do the respective costs of manufacturing, transporting, and assembly of the wind turbines. Thus, the economic benefits of increased wind turbine sizes must be weighed against these factors. For example, the costs of manufacturing, transporting, and/or assembling aerodynamic components for a larger wind turbine may significantly impact the economic advantage of providing such a wind turbine. One such aerodynamic component comprises a dome-shaped aerodynamic component (referred to herein as "dome") that is placed in front of a wind turbine hub to enable an acceleration of an airflow into more aerodynamically efficient region of a wind turbine rotor blade and thus provide an increase in efficiency of an existing wind turbine.

Accordingly, there is a need for a wind turbine dome that may be manufactured and assembled in a fashion that reduces the associated transportation and/or assembly costs of a wind turbine.

BRIEF DESCRIPTION

According to one embodiment, an aerodynamic dome for a wind turbine is placed in front of a wind turbine hub. The wind turbine dome comprises a dome-shaped frame, comprising a plurality of arcuate radial spar supports. At least one cover segment envelops at least a portion of the dome-shaped frame to form at least a portion of an outer dome structure. At least one attachment mechanism couples the at least one cover segment to the dome-shaped frame.

According to another embodiment, an aerodynamic dome for a wind turbine comprises a plurality of rigid arcuate panels. A plurality of connecting elements connects the plurality of rigid arcuate panels together to form a dome-shaped structure.

According to yet another embodiment, a method assembling a dome structure for a wind turbine comprises interconnecting a plurality of arcuate radial spar supports to form a dome-shaped frame; laying one or more cover segments onto at least a portion of the dome-shaped frame to form at least a portion of an outer dome structure; and attaching each cover segment to the dome-shaped frame.

DRAWINGS

These and other features, aspects, and advantages of the present invention will become better understood when the following detailed description is read with reference to the accompanying drawings, wherein:

FIG. 4 illustrates features of a wind turbine dome mounted to a wind turbine blade structure, according to one embodiment;

FIG. 5 is a top view illustrating a top view of a pie-shaped segment depicted in FIG. 4;

FIG. 6 depicts an exemplary cross-section of the pie-shaped segment illustrated in FIG. 5 viewed from the perimeter ring toward the center support;

FIG. 7 is an exemplary cross-section of the perimeter ring depicted in FIG. 6, according to one embodiment; and FIG. 8 illustrates panels/segments of a dome structure that can be connected together at the open-ended sides of the panels using connecting elements, according to one embodiment.

Figure 1:
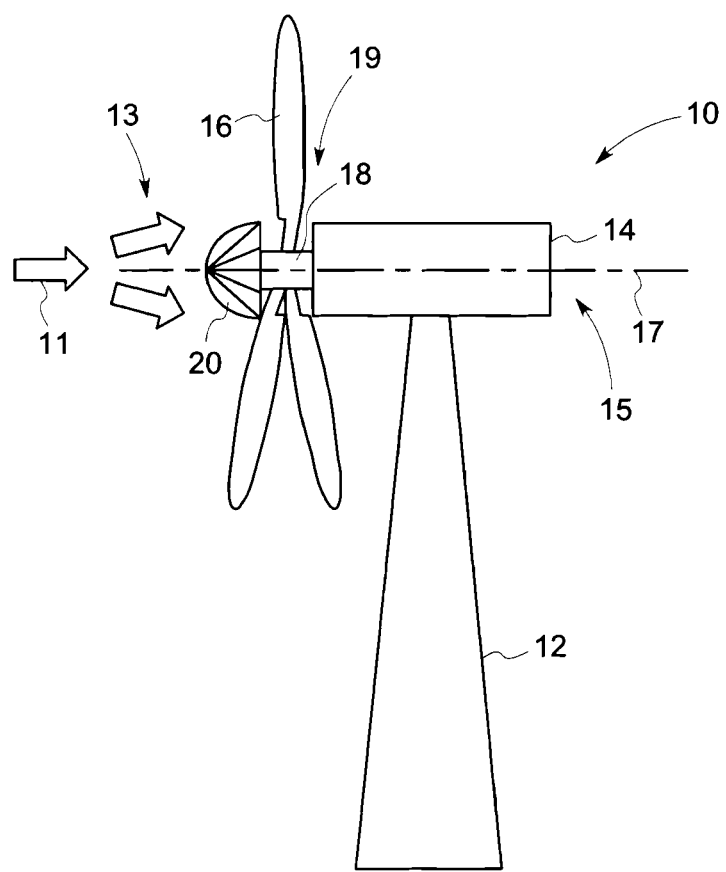
FIG. 1 is a schematic side view of a wind turbine including an aerodynamic dome component placed in front of a turbine hub, according to one embodiment.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Reference now will be made in detail to various embodiments, one or more embodiments of which are illustrated in the drawings. Each embodiment is provided by way of explanation, not limitation. In fact, it will be apparent to those skilled in the art that various modifications and variations can be made without departing from the scope or spirit of the invention. For instance, features illustrated or described as part of one embodiment can be used with another embodiment to yield a still further embodiment. Thus, it is intended that such modifications and variations come within the scope of the appended claims and their equivalents.

In general, the present subject matter is directed to an aerodynamic dome assembly for a wind turbine. The dome structure may cover a rotor hub or both a rotor hub and possibly a portion of the wind turbine blades, depending upon the particular application. The costs associated with transporting such a dome assembly to a wind turbine site and/or assembling the dome assembly may be significantly reduced. For example, in one embodiment, the dome truss and surface sections may be transported and assembled in segments. These segments may then be shipped to the wind turbine site and/or assembled together at the wind turbine site (e.g., at a location near the wind turbine tower or aloft using a crane or other suitable lifting mechanism). The segmented structure advantageously allows a smaller segment to be handled/installed during windy conditions. In one embodiment, repairs are more easily implemented by replacing a single section as contrasted with replacing a complete dome structure. In another embodiment, the dome structure is field assembled without the use of welds or attachment hardware such as bolts.

Referring now to the drawings, FIG. 1 illustrates a perspective view of one embodiment of a wind turbine 10. The wind turbine 10 includes a tower 12 with a nacelle 14 mounted thereon. A plurality of rotor blades 16 are mounted to a rotor hub assembly 18, which is, in turn, coupled to a main rotor shaft (not shown) of the wind turbine 10. An aerodynamic dome 20 is positioned in front of and upwind from the rotor hub assembly 18.

It should be noted that relative adjectives like in front, backward, upwind, behind and rear are defined with respect to the wind direction 11 related to a wind turbine 10 in operation, i.e. when the wind turbine 10 produces electrical energy. That means that the wind 11 flows from a front end 13 to a back end 15 of the wind turbine 10. In addition, the terms axial or radial relate to the rotor axis 17 of the hub 18, when the wind turbine 10 produces electrical energy. Thus, as described herein, the rotor axis 17 is substantially parallel to the wind 11 direction.

Some embodiment of the dome 20 may be attached to the wind turbine rotor 19 or the rotor hub 18, depending upon the application. Other embodiments may be attached to the rotor blades 16. Still other embodiments may be attached to rotor blade or hub extension structures. The wind turbine power generation and control components (not shown) may be housed within the nacelle 14. It should be appreciated that the wind turbine 10 of FIG. 1 is provided for illustrative purposes only to place the present subject matter in an exemplary field of use. Thus, one of ordinary skill in the art should understand that the present subject matter is not limited to any particular type of wind turbine configuration. The rotor hub assembly 18 including the dome 20 advantageously is capable of withstanding the external wind loadings as well as the loads provoked by the wind turbine operation.

Figure 2:
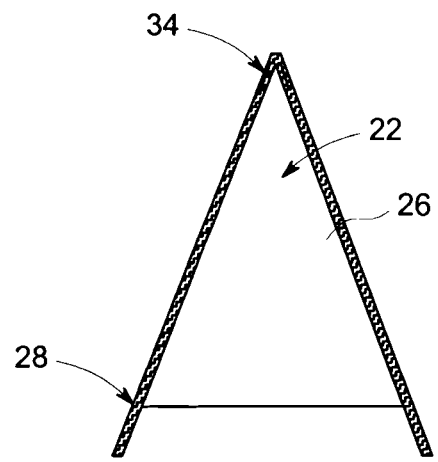
FIG. 2 illustrates one pie-shaped segment of a dome structure, according to one embodiment.
Figure 3:
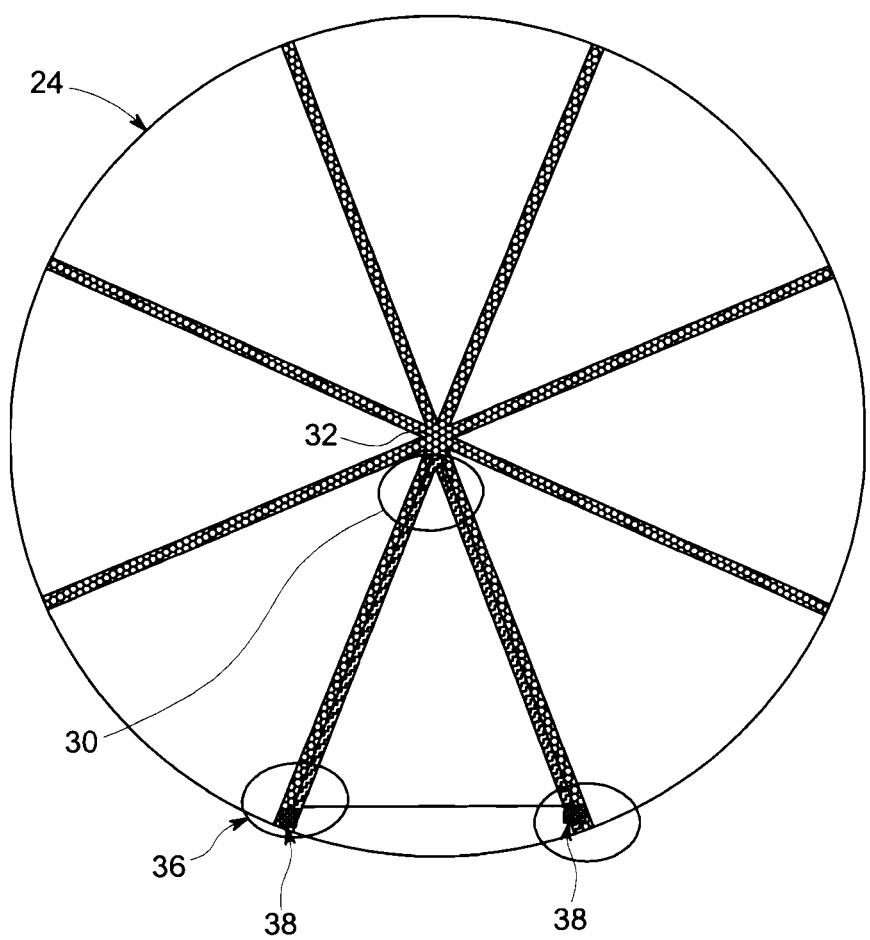
FIG. 3 illustrates an underlying dome frame comprising a plurality of pie-shaped segments such as depicted in FIG. 2.

FIG. 2 illustrates one pie-shaped segment 22 of an aerodynamic dome structure 20 such as depicted in FIG. 1, according to one embodiment that comprises a plurality of pie-shaped segments 22 attached to an underlying dome frame 24 illustrated in FIG. 3. The pie-shaped segment 22 comprises, without limitation, a fabric, metal, polycarbonate, plastic, composite, or a composite sandwich panel 26 that may be attached to its own frame 28. The underlying dome frame 24, according to one embodiment, is configured with snaps/slots 30 near, proximal to, or adjacent to a center portion 32 of the frame 24. According to one embodiment the slots 30 are positioned adjacent to the center portion 32. Protrusions 34 on the side or bottom of the segment frame 28 are configured to snap/slide respectively into the dome frame snaps/slots 30. The segment frame 28 according to one embodiment is locked into place near its outer vertices 36 at the outer diameter of the underlying dome frame 24 via one or more spring activated latches 38.

In summary explanation, a full aerodynamic dome structure 20 is created according to one embodiment, by attaching a plurality of pie-shaped segments 22 to an underlying dome framework 24 that has a structure that looks like a plurality of pie-shaped sections. Separate pie-shaped pieces/segments 22 that will lie on top of the dome framework are manufactured separately. The pie-shaped pieces/segments 22 are created in sections that match the dome framework 24. In one embodiment, the dome frame 24 may have slots or grooves 30 in the areas near the center. The frames 28 for the pie-shaped sections/segments 22 may have protrusions 34 that align with the slots or grooves 30.

The pie-shaped section frames 28 can be easily slid/snapped into place while uptower or on the ground. The pie-shaped section frame 28 may be locked into place at the outer diameter of the dome frame 24 with one or more spring loaded latches 38. The pie-shaped sections/segments 22 may be constructed of a suitable fabric, polycarbonate, composite, e.g. glass or carbon, composite sandwich, e.g. glass or carbon with a lightweight core such as foam, or a suitable metal.

FIG. 4 illustrates one portion of a wind turbine dome 40 using the principles described herein according to another embodiment. Dome 40 comprises a plurality of pie-shaped segments 42 that may be constructed, for example, from a suitable material, such as, without limitation, a metal, or a fabric on a frame such as stated herein. According to one aspect, the pie-shaped segments 42 are bolted together and are also attached to a center support 44 at or near the center of the dome 40 using suitable attachment hardware based on a particular application. The pie-shaped segments 42 are attached at the outer peripheries to a perimeter ring 46 that is supported via a plurality of rigid spar supports 48 affixed to the center support 44. At least one spar support 48 of the plurality of spar supports 48 comprises at least one of a channel-frame cross-section structure, a box-frame cross-section structure, an I-beam structure, and combinations thereof. It can be appreciated that the spar supports 48 may comprise any type of beam or channel, e.g. square, rectangular, box, C or U shaped, any beam or channel shape so long as the resultant structure can be applied according to the principles described herein.

FIG. 5 is a top view illustrating one embodiment of the pie-shaped segment 42 that may be constructed such as described herein; while FIG. 6 depicts an example cross-section of the pie-shaped segment 42 viewed from the perimeter ring 46 toward the center support 44.

FIG. 7 is an example cross-section of the perimeter ring 46 that may be constructed, for example, without limitation, from a plurality of rigid sheet steel segments 49. According to one embodiment, the perimeter ring 46 comprises 6 or more segments 49.

The embodiments described herein with reference to FIGS. 1-8 advantageously allow a very large dome to be easily erected using small segments. The principles described herein can be used to erect a dome more easily in uptower installations. One embodiment described herein is assembled using panels that slide in and snap onto a matching frame without the use of hardware.

Some embodiments, such as those described herein with reference to FIGS. 2 and 3, may employ panels 22 that are rigid or stiff, other than fabric panels, and that are placed directly onto a dome frame 24. Such panels 22 can be attached to the corresponding dome frame 24 using, without limitation, bolts, rivets, double sided tape, hook and loop or a combination thereof. A center support and/or one or more support rings may be used.

Other embodiments may employ, for example, panels 22 constructed of, without limitation, composite material or metal, where the cross-section of each panel 22 has the shape of a rectangle that is devoid of or missing one of its long sides, or that employs a substantially C-shape cross-section, or a U-shape cross-section such as depicted in FIG. 8. Such C or U-shaped panels may employ channel configurations generally associated with structures such as C-channels or cross-section configurations generally associated with C-shaped cross-section beams. The panels 22 can be connected together at the open-ended sides of the panel 22 using connecting elements 50, such as bolts, rivets, or crimping, for example, thus eliminating the need for an underlying frame 24, or at least radial members. The resultant embodiments may still require a center support and/or support rings, depending upon the particular application(s).

Still further embodiments may employ panels 22 having square, rectangular, or box-frame cross-sectional configurations. It can be appreciated that any beam or channel shape may be employed to construct an aerodynamic wind turbine dome using the principles described herein, depending upon the particular application.

While the invention has been described in terms of various specific embodiments, those skilled in the art will recognize that the invention can be practiced with modification within the spirit and scope of the claims.

The invention claimed is:

1. An aerodynamic dome, the aerodynamic dome comprising:
a plurality of arcuate radial spar supports together forming a dome-shaped frame positioned upstream of a rotor hub assembly of a wind turbine; and
at least one cover segment enveloping at least a portion of the dome-shaped frame to form at least a portion of an outer dome structure of the wind turbine,
wherein at least one of the dome shaped frame and the outer dome structure are attached to at least one of a wind turbine rotor, a wind turbine rotor hub, a rotor blade, a rotor blade extension structure or a rotor hub extension structure of the wind turbine.

2. The aerodynamic dome according to claim 1, wherein the at least one cover segment is a metal sheet segment, a fabric segment, a composite panel segment, a composite sandwich segment, a plastic segment, a polycarbonate segment, or a combination thereof.

3. The aerodynamic dome according to claim 1, further comprising at least one attachment mechanism coupling the at least one cover segment to the dome-shaped frame.

4. The aerodynamic dome according to claim 3, wherein the at least one attachment mechanism is selected from a bolt, a rivet, crimping, double-sided tape, a hook and loop element, a protrusion and slot structure, and combinations thereof.

5. The aerodynamic dome according to claim 1, wherein the at least one cover segment comprises a pie-shaped segment when viewed from a direction substantially orthogonal to an outermost surface of the at least one cover segment and having one of a rectangular cross-section devoid of a long side, a C-shape cross-section or a U-shape cross-section.

6. The aerodynamic dome according to claim 1, further comprising a support structure for securing the plurality of arcuate radial spar supports proximal an apex of the aerodynamic dome.

7. The aerodynamic dome according to claim 1, further comprising a ring structure for securing the plurality of arcuate radial spar supports.

8. The aerodynamic dome according to claim 1, wherein at least one spar support of the plurality of spar supports comprises at least one of a channel-frame cross-section structure, a box-frame cross-section structure, an I-beam structure, and combinations thereof.

9. An aerodynamic dome, the aerodynamic dome comprising:
a plurality of rigid arcuate panels; and
a plurality of connecting elements connecting the plurality of rigid arcuate panels together to form a dome shaped structure defining the aerodynamic dome, wherein the aerodynamic dome is positioned upstream of a rotor hub assembly of a wind turbine,
wherein at least one of the plurality of rigid arcuate panels and the plurality of connecting elements are attached to at least one of a wind turbine rotor, a wind turbine rotor hub, a rotor blade, a rotor blade extension structure or a rotor hub extension structure of the wind turbine.

10. The aerodynamic dome according to claim 9, wherein at least one of the plurality of rigid arcuate panels comprises a metal sheet panel, a composite panel, a composite sandwich panel, a plastic panel, a polycarbonate panel, or a combination thereof.

11. The aerodynamic dome according to claim 9, wherein the at least one connecting element of the plurality of connecting elements is selected from a bolt, a rivet, crimping, double-sided tape, a hook and loop element, a protrusion and slot structure, and combinations thereof.

12. The aerodynamic dome according to claim 9, wherein at least one rigid arcuate panel of the plurality of rigid arcuate panels comprises one or more of a pie-shaped segment when viewed from a direction substantially orthogonal to an outermost surface of the at least one rigid arcuate panel, and having one of a rectangular cross-section devoid of a long side, a c-shape cross-section or a u-shape cross-section.

13. The aerodynamic dome according to claim 9, further comprising a support structure for securing the plurality of rigid arcuate panels proximal an apex of the aerodynamic dome.

14. The aerodynamic dome according to claim 9, further comprising at least one ring structure for securing the plurality of rigid arcuate panels.

15. A method of assembling an aerodynamic dome, the method comprising:
interconnecting a plurality of arcuate spar supports to form a dome-shaped frame positioned upstream of a rotor hub assembly of a wind turbine; and
attaching via at least one attachment mechanism, one or more cover segments to the dome-shaped frame to form at least a portion of an outer dome structure of the wind turbine,
wherein at least one of the dome shaped frame and the outer dome structure are attached to at least one of a wind turbine rotor, a wind turbine rotor hub, a rotor blade, a rotor blade extension structure or a rotor hub extension structure of the wind turbine.

16. The method according to claim 15, wherein each cover segment of the one or more cover segments is selected from a metal sheet segment, a fabric segment, a composite panel segment, a composite sandwich segment, a plastic segment, a polycarbonate segment, and a combination thereof.

17. The method according to claim 15, wherein each cover segment of the one or more cover segments comprises one or more of a pie-shaped segment when viewed from a direction substantially orthogonal to an outermost surface of the cover segment, and having one of a rectangular cross-section devoid of a long side, a c-shape cross-section or a u-shape cross-section.

18. The method according to claim 15, wherein interconnecting a plurality of arcuate spar supports to form a dome-shaped frame comprises attaching the plurality of arcuate spar supports to a center structure proximal an apex of the aerodynamic dome.

19. The method according to claim 15, wherein interconnecting a plurality of arcuate spar supports to form a dome-shaped frame comprises attaching the plurality of arcuate spar supports to a ring structure.

20. The method according to claim 15, wherein attaching via at least one attachment mechanism, one or more cover segments to the dome-shaped frame to form at least a portion of an outer dome structure comprises attaching one more cover segments to at least a portion of the dome-shaped frame via at least one of a bolt, a rivet, a double-sided tape, crimping, a hook and loop element, a protrusion and slot structure, and combinations thereof.

* * * * *